United States Patent
Gerber

(10) Patent No.: US 8,232,005 B2
(45) Date of Patent: *Jul. 31, 2012

(54) LEAD ACID BATTERY WITH TITANIUM CORE GRIDS AND CARBON BASED GRIDS

(76) Inventor: Eliot Gerber, Moraga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/199,806

(22) Filed: Sep. 10, 2011

(65) Prior Publication Data

US 2012/0003509 A1 Jan. 5, 2012

Related U.S. Application Data

(63) Continuation-in-part of application No. 12/799,734, filed on May 3, 2010, now Pat. No. 8,048,572.

(51) Int. Cl.
*H01M 4/68* (2006.01)
*H01M 10/20* (2006.01)
*H01G 9/058* (2006.01)

(52) U.S. Cl. ............... 429/225; 429/231.8; 429/245; 361/502

(58) Field of Classification Search ........... 429/225, 429/231.8, 232, 245; 361/502, 506
See application file for complete search history.

(56) References Cited

U.S. PATENT DOCUMENTS

| | | |
|---|---|---|
| 2,713,079 A | 7/1955 | Carrick et al. |
| 2,739,997 A | 3/1956 | Carrick et al. |
| 3,486,940 A | 12/1969 | Ruben |
| 3,798,070 A | 3/1974 | Ruben |
| 3,870,563 A | 3/1975 | Ruben |
| 4,326,017 A | 4/1982 | Will |
| 4,554,228 A | 11/1985 | Kiessling |
| 4,666,666 A | 5/1987 | Taki et al. |
| 4,683,648 A | 8/1987 | Yeh |
| 4,760,001 A | 7/1988 | Nann et al. |
| RE33,133 E | 12/1989 | Kiessling |
| 5,223,354 A | 6/1993 | Senoo et al. |
| 5,238,647 A | 8/1993 | Mitsuyoshi et al. |
| 5,339,873 A | 8/1994 | Feldstein |
| 5,379,502 A | 1/1995 | Feldstein |
| 5,411,821 A | 5/1995 | Feldstein |
| 6,252,762 B1 * | 6/2001 | Amatucci ............... 361/502 X |
| 6,316,148 B1 | 11/2001 | Bhardwaj et al. |
| 6,334,913 B1 | 1/2002 | Yashiki et al. |
| 6,466,429 B1 | 10/2002 | Volfkovich et al. |
| 6,706,079 B1 | 3/2004 | Shmatko et al. |
| 6,979,513 B2 | 12/2005 | Kelley et al. |

(Continued)

OTHER PUBLICATIONS

U.S. Appl. No. 11/048,104, filed Feb. 2, 2005, Jung et al.

(Continued)

*Primary Examiner* — Stephen J. Kalafut
(74) *Attorney, Agent, or Firm* — Eliot Gerber

(57) ABSTRACT

A hybrid lead acid electric storage battery uses conventional lead-acid secondary battery chemistry. The battery is a sealed battery or an unsealed battery. The battery has a set of positive battery grids (plates) having cores of thin titanium expanded metal with a thickness, if flattened, preferably in the range 0.2 mm to 0.7 mm and most preferably 0.3 mm to 0.4 mm. The grid cores are of a titanium alloy containing a platinum group metal. The cores are coated with hot dip lead and are not lead electroplated.

The negative plates are carbon based assemblies. Each such assembly has a metal core, preferably a sheet of expanded copper, a corrosion shield sealing the metal core, and an outer layer primarily of activated carbon covering the shield.

16 Claims, 2 Drawing Sheets

U.S. PATENT DOCUMENTS

| | | |
|---|---|---|
| 7,006,346 B2 | 2/2006 | Volfkovich et al. |
| 7,033,703 B2 | 4/2006 | Kelley et al. |
| 7,110,242 B2 | 9/2006 | Adrianov et al. |
| 7,119,047 B1 | 10/2006 | Adrianov et al. |
| 7,569,514 B2 | 8/2009 | Adrianov et al. |
| 7,732,098 B2 * | 6/2010 | Gerber ............... 429/245 X |
| 7,881,042 B2 | 2/2011 | Buiel et al. |
| 7,923,151 B2 | 4/2011 | Lam et al. |
| 7,998,616 B2 * | 8/2011 | Buiel et al. ............ 429/245 X |
| 2004/0151957 A1 | 8/2004 | Brooks et al. |
| 2004/0151982 A1 | 8/2004 | Shivashankar et al. |
| 2006/0292448 A1 | 12/2006 | Gyenge et al. |
| 2007/0141468 A1 | 6/2007 | Barker |

OTHER PUBLICATIONS

U.S. Appl. No. 11/279,103, filed Apr. 8, 2006, Jung et al.

Dai "Lead-plated titanium grids etc." 41 Power Sources Conference, Jun. 14-17, 2004.

Dai al. "Corrosion of lead Plate Titanium etc", ( ref.on Google).

* cited by examiner

LEAD ACID BATTERY WITH TITANIUM CORE GRIDS AND CARBON BASED GRIDS

RELATED UNITED STATES PATENT APPLICATIONS

The present patent application is a continuation-in-part application partly based upon the applicant's prior U.S. patent application as follows: application Ser. No. 12/799,734 filed May 3, 2010 (20110033744) entitled "Long life lead acid battery having titanium core grids and method of their production", now U.S. Pat. No. 8,048,572.

FIELD OF THE INVENTION

The present invention relates to hybrid lead acid storage batteries, and more especially to the cells for such batteries.

BACKGROUND OF THE INVENTION

The need for improvements in lead-acid storage batteries is widely recognized.

Hundreds of articles, patents and research projects have been directed toward improving such batteries. Some of the important characteristics that still need improvement are power density, mechanical ruggedness, long life and multiple cycles (charge-discharge). Some important uses for such improved batteries are in "start stop" cars and electric cars (EV) and plug-in hybrid cars (PHEV).

It is generally believed that automobile batteries have a lifetime of 3, or at most 6, years and that to have longer life they should have thicker lead positive grids. In contrast, the present invention intends to provide a 10 year lifetime battery using positive grids.

It has been suggested that the power or lifetime of lead acid batteries may be increased by substituting lead plates (grids) with other materials. However, it is believed that almost all commercially available lead acid batteries use lead plates. There are now a number of projects that have been reported to use non-metal battery plates. Firefly Energy has announced it is developing carbon foam plates, see U.S. Pat. Nos. 6,979,513 and 7,033,703. Also, Jung et al have filed patent applications on carbon battery plates, see U.S. applications Ser. Nos. 11/048,104 and 11/279,103 (both now abandoned).

Axion Power now has eight issued U.S. patents covering various aspects of its PbC (lead-carbon) hybrid battery grid technologies. They are: U.S. Pat. No. 6,466,429—Electric double layer capacitor; U.S. Pat. No. 6,628,504—Electric double layer capacitor; U.S. Pat. No. 6,706,079—Formation and charge of the negative polarizable carbon electrode in an electric double layer capacitor; U.S. Pat. No. 7,006,346 Positive Electrode of an electric double layer capacitor; U.S. Pat. No. 7,110,242—Electrode for electric double layer capacitor; U.S. Pat. No. 7,119,047 and U.S. Pat. No. 7,569,514—Modified activated carbon; U.S. Pat. No. 7,881,042—Activated Carbon Electrode with PTFE Binder.

CSIRO (Commonwealth Scientific & Industrial Research Organization—AU) has announced its " Ultra-Battery", a hybrid battery related to U.S. Pat. No. 7,929,151.

One suggestion is to use lead electroplated on a core of another metal, such as aluminum, copper, steel or titanium. Some of the prior patents and articles about lead-plated cores, or otherwise relevant, are set forth below. All of these patents and articles, and all others cited in this patent application, are included herein by reference. A series of patents to Rubin uses expanded titanium or titanium alloy positive grids without a lead coating. In U.S. Pat. No. 3,486,940 Rubin discloses a titanium nitride core with a gold covering layer; in U.S. Pat. No. 3,615,831 he discloses a similar gold covering layer over a titanium-molybdenum-zirconium alloy core and in U.S. Pat. No. 4,251,608 he discloses a steel or titanium core with a graphite protective coating. See also Rubin U.S. Pat. Nos. 3,798,070 and 3,870,563 and Will U.S. Pat. No. 4,326,017.

Lead is plated on copper in Senoo U.S. Pat. No. 5,223,354; Senoo U.S. Pat. No. 5,093,970; Nann U.S. Pat. No. 4,760,001 and Kiessling U.S. Pat. No. 4,554,228 and U.S. Pat. No. Re.:33,133. U.S. Pat. No. 4,683,648 to Yeh shows a titanium core electroplated with lead. U.S. Pat. Nos. 5,379,502; 5,339,873; 5,544,681 and 5,411,821 disclose copper or steel or other materials as cores with titanium and lead layers. U.S. Pat. No. 6,316,148 to Bhardwaj discloses a battery using aluminum foil which is coated with lead. U.S. Pat. Nos. 2,739,997 and 2,713,079 to Carrick disclose aluminum plates electroplated with lead in an aqueous plating bath.

The following articles may be considered relevant: Dai et al. "Lead-plated titanium grids etc." 41 Power Sources Conference, Jun. 14-17 (2004) and Dai et al. " Corrosion of Lead Plate Titanium etc" (ref. Google).

SUMMARY OF THE INVENTION

The hybrid battery combines an asymmetric supercapacitor and a lead acid battery in a single unit, creating a hybrid car battery that should last longer, cost less and be more powerful than conventional Valve-Regulated Lead Acid (VRLA) batteries. Such a hybrid battery should have superior input and output power through a wide state of charge (SOC) range and partial state of charge (PSOC) life. It should also have a life cycle that is at least four times longer and produce more power than conventional battery systems. The energy in this type of hybrid device is stored both electrostatically and electrochemically.

An improved battery hybrid may be useful as the starting battery in "stop-start" cars in which the motor is shut down when the car stops, for example at stop light. Such "stop-start" operation saves gasoline and reduced air pollution. This improved hybrid battery, in another version, may be a "super-battery" used to drive electric cars (EV) and plug-in hybrid cars (PHEV). The "super-battery" should be competitive with Li-Ion and Ni-MH battery packs in energy density at a fraction of their costs.

It is the theory of the present invention that the life-time of positive grids may be extended using a titanium-paladium/ruthanium alloy so they are corrosion resistant. Those positive grids are combined with carbon based negative grids to form a capacitor so that the battery becomes a hybrid battery.

The difference in temperature under an automobile hood, over a 24 hour period my exceed over 100 degrees F., for example during summer in the desert and nighttime chill The contraction and expansion of lead battery grids may cause flaking and non-adherence of the battery paste and corrosion of the grids. In the present invention the positive grids are thinner, so they have less bulk expansion/contraction and they are made of titanium, which has a much lower coefficient of expansion with temperature, compared to lead. The thermal expansion of titanium at 25 degrees C. is 8.6 micrometer -1 K-1 and that of lead about 3 times greater. The typical thickness of the titanium core of the grids of the present invention are 0.4 mm and the thickness of a typical lead grid is 1.2 mm, three times the thickness of the titanium grids. Consequently the bulk difference in thermal expansion is that lead grids expand and contract about six times as much as the titanium grids.

In accordance with the present invention positive plates for lead acid storage batteries, either conventional sealed and unsealed lead acid batteries, consist of thin grids having thin titanium core grids.

The titanium core is formed using expanded metal technology. The titanium core is an alloy containing palladium or/and ruthenium. It is cleaned and then electroplated with a flash coating (0.5 to 5 microns) of copper or nickel, most preferably copper. They are then preferably electroplated with a flash coating of tin. They are then dipped into a hot air leveler to be hot dip coated with lead, preferably 50-200 microns on each side. Preferably the cores are formed from a titanium alloy containing less than 0.9 palladium and/or ruthenium. Most preferably the alloy contains 0.02% to 0.2% ruthanium. Preferably the finished grids are about 0.4 to 0.8 mm thick and may be processed by automated battery paste filling machines. They are the positive grids of the battery.

The negative grids are carbon based grids. Preferably, for a high-power density battery for EV and PHEV cars the carbon based grids are also thin, preferably 0.7 mm to 1.5 mm and most preferably 0.8 mm to 1.2 mm.

The battery is a hybrid supercapacitor energy storage device including at least one titanium core positive electrode, at least one carbon negative electrode, a separator, a casing, and an acid electrolyte. The positive electrode is enveloped in a glass mat separator.

The carbon electrode comprises a highly conductive current collector which is a metal material, preferably copper, sandwiched between two sheets of electronically conductive shield material. An outer layer of activated carbon, using a binder such as polyethylene or PTFE, is in electrical contact with the shield material of the current collector.

DETAILED DESCRIPTION OF THE INVENTION

Figure 1:
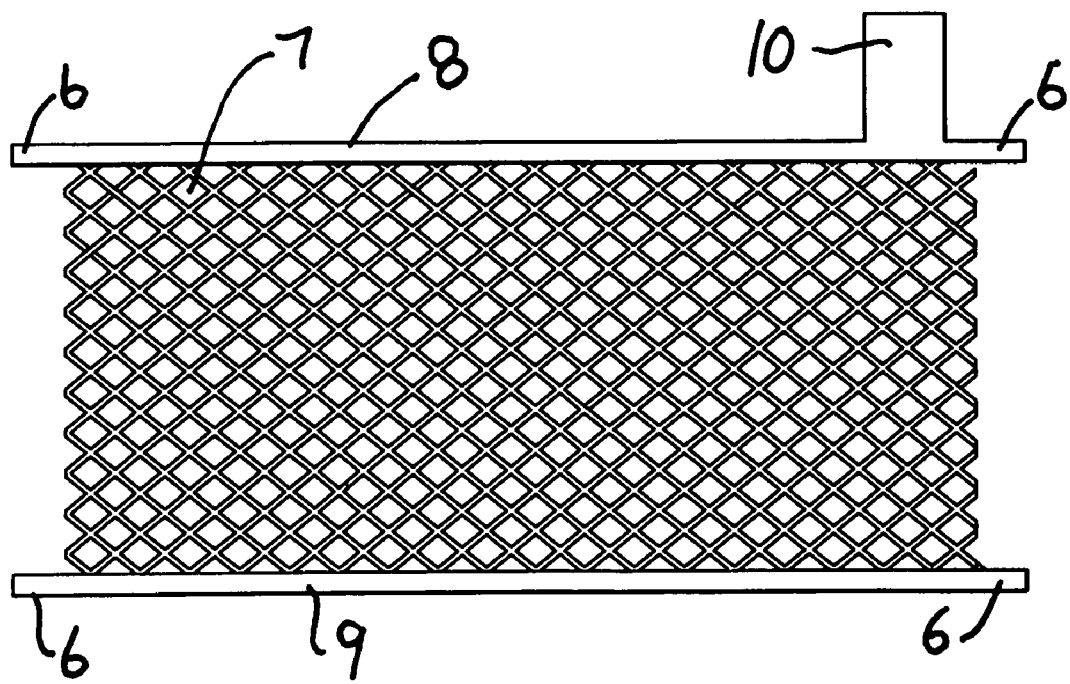
FIG. 1 is a top plan view of a finished positive grid of the present invention.

The grid 7 of FIG. 1 is formed from a titanium thin sheet (thin coil). Its thickness, for starter batteries or auto batteries for electric and hybrid cars, is in the preferred range of 0.1 mm to 0.7 mm and most preferably 0.2 mm to 0.4 mm and in any event, less than 0.7 mm. Most preferably the thickness of the core is about 0.3-0.4 mm for those batteries.

However, for deep discharge batteries, thicker grids are preferably used, although not as thick as conventional lead grids used for such batteries. For deep discharge batteries the thickness of the titanium is preferably 0.4 mm-2.0 mm and more preferably 0.5 mm-0.8 mm.

Titanium has good electrical conductivity compared to lead; it is stronger than lead; it is lighter than lead; however it may not be completely corrosion resistant to the dilute sulfuric acid ("battery acid") used in lead acid batteries, compared to the alloys explained below. "Expanded" means perforated and expanded metal.

As shown in FIG. 1, in the preferred grid core the frame (solid and not expanded metal) has a top bar 8, a bottom bar 9, a lug 10, a body portion 7, and connection wings 6. There is no frame at the sides. The bars are of the same material and thickness as the expanded metal body. The preferred dimensions are: top bar and the bottom bar 4 mm high (0.157 in.); lug 15.875 mm wide (⅝th inch) and 25.4 mm high (1 inch).

(above the top bar). The expanded metal body is not flattened for the "stop-start battery" but is flattened for the "super-battery" The metal body is 142.875 mm wide (5⅝th inch) and 120.65 mm high (4¾th inch) including the 4 mm top bar and bottom bar. The lug has a 4 mm gap from the edge of the body.

All of the grid cores are the same size and shape and thickness. All of them are made with an expanded metal body. Preferably the expanded metal body has a Diamond pattern:
LWD (long width diamond) 12 mm/SWD (short width diamond) 7 mm; the preferred width of strand 1 mm; thickness of piece (grid) after expansion 0.35 mm The grids are preferably formed from a titanium alloy containing between 0.9% and 0.009% of either ruthenium or palladium or both ruthenium and palladium and may contain molybdenum 5-20%. The preferred range, in the titanium alloy, is 0.2% to 0.01% of palladium or ruthenium or both, most preferably 0.2% to 0.02%. The titanium grids, after forming and cleaning may be coated with a protective coating. The preferred coatings are tin oxide and/or a flash electroplatings of 0.05-10 microns thick preferably 2-5 microns, of copper followed by a flash electroplated coating of tin, also 0.05-10 microns thick, preferably 2-5 microns thick.

In one embodiment of the present invention the positive grids titanium cores are cleaned as follows: soak the grid cores, while in the form shown in FIG. 1, in the following sequence of liquids: 1. acetone or acetal acetate 2. water and detergent with ultrasonic, 3. tap water with ultrasonic, 4 deionized water with ultrasonic, 5. distilled water with ultrasonic, and 6. isopropal alcohol.

The lead used to coat the titanium cores preferably does not include materials used to strengthen, harden, or stiffen lead grids in conventional lead-acid batteries. Such strengthening, hardening and stiffening materials include antimony and calcium (0.1-20%). They are not necessary as the titanium or copper cores provide the required strength and stiffness. Preferably the lead alloy is antimony free.

Preferably the lead includes alloying metals which aid in reducing corrosion, such alloying metals including tin (5%-15%), cobalt, a small amount of calcium (0.03-0.05%) and molybdenum (10-30%)

As shown in FIG. 1 the titanium cores are formed in a metal expander machine and, for use in "super-batteries", they are flattened by being pressed between rollers. The grids are stamped but are not separated at the connection wings 6. The connected expanded and stamped strip is processed in a lead coating machine such as a hot air solder leveler using heated air knives. The lead coating thickness, on each side, is preferably 50 to 300 microns and most preferably about 125 to 175 microns.

The lead is coated by a hot melt process and not by electroplating. The hot melt process is less expensive and faster than electroplating. It is believed that hot lead coating is more dense and less prone to pinholes compared to electroplating. The prior art shows hot lead coating of various products but not of copper or titanium battery grids; see U.S. Pat. Nos. 3,941,906 and 4,097,625. In the hot melt process the grids are expanded and stamped to form a strip which is then lead coated. The grids are cut from the strip after being lead coated.

In accordance with U.S. Pat. No. 7,923,151 to Axion Power, each carbon electrode assembly comprises a sheet of highly conductive material sealed between two sheets of electronically conductive shield material. The shield material is chemically resistant and electrochemically stable in acid electrolyte. Preferably an activated carbon electrode layer is adhered to and in electrical contact with each side of the shield material. The activated carbon is adhered to the conductive shield material by a binder material chosen from PTFE, polyethylene, and other polymers.

The current collector is comprised of a sheet of metal having better conductivity than lead and may be copper, titanium, silver, gold, platinum, palladium, tin, cobalt, nickel, magnesium, molybdenum, and mixtures, combinations, and alloys thereof including stainless steel.

The shield material comprises a sheet of expanded graphite foil impregnated with a material chosen from the group consisting of paraffin, other waxes, PTFE(polytetrafluoroethylene), polyethylene, furfural, some other thermoplastic materials and mixtures thereof. The preferred foil is low-density expanded graphite impregnated with 90-99% paraffin and 1-10% rosin.

The sheets of electronically conductive shield material are sealed around the periphery of the current collector and the carbon electrode is adhered to and in electrical contact therewith. The carbon electrode layer contains inert binder material, 10-25% by weight, added to the activated carbon particles, the inert binder material being chosen from the group consisting of PTFE(polytetrafluoroethylene), ultra high weight polyethylene powder, thermoplastic powder and thermoplastic granules. The carbon of the carbon electrode layer if preferably activated carbon, however alternatives include carbon black and amorphus carbon.

In theory, the batteries of the present invention should have a longer life and take a greater number of charging/discharging cycles than conventional lead acid batteries. It is believed that lifetime, and the limitation on cycles, relates to expansion and contraction of the grids with temperature changes and the growth of lead fingers. The positive grids of the present invention should have less expansion/contraction due to temperature changes because: 1. the positive grid cores are thinner than conventional lead grids, and 2. the grid cores of titanium have a lower coefficient of temperature expansion than lead.

The battery grid paste, the pasting process and the grid curing process may be the same as with conventional auto battery manufacturing.

Figure 2:
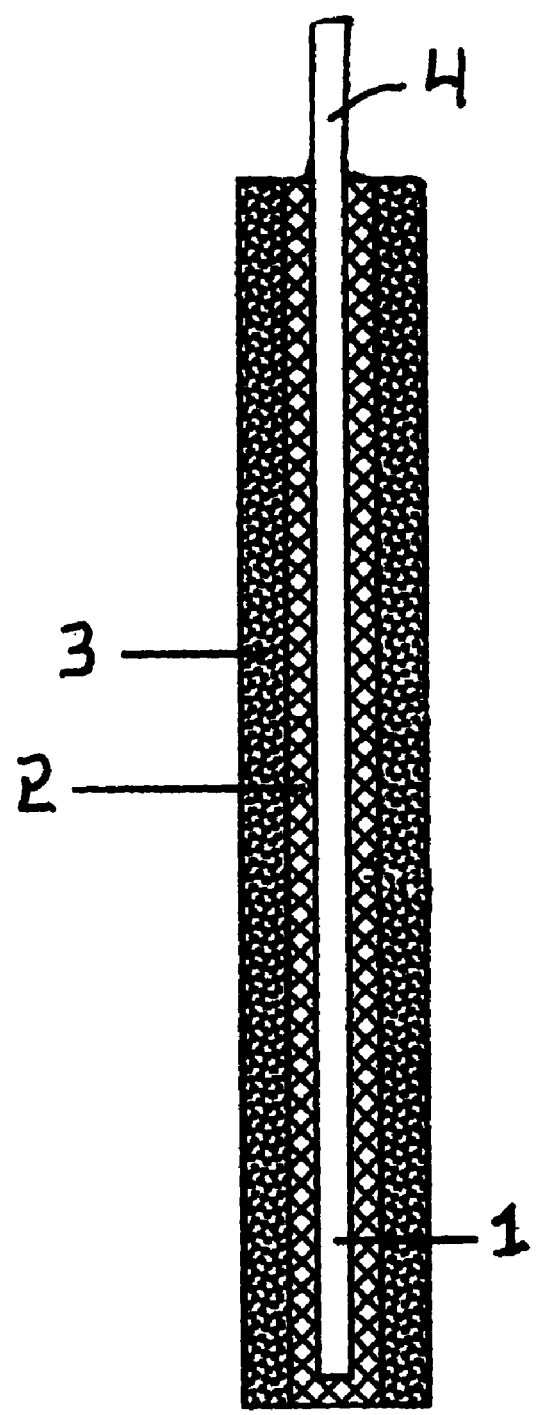
FIG. 2 is a side cut-away view of a negative carbon based grid used in the present invention.

An embodiment of a carbon electrode assembly is shown in FIG. 2. A sheet of metal 1 is preferably an expanded metal mesh of copper. A corrosion resistant shield 2 is sealed to both sides and edges of sheet 1. The shield 2 is preferably graphite impregnated with paraffin and rosin. A sheet 3 of activated carbon covers the shield 2. A lug 4 extends from the copper sheet 1.

In accordance with the present invention, there is provided a lead-acid battery having a plurality of positive and negative battery grids, the polarity of the grids is determined by charging the battery after the grids are pasted and the battery assembled. At least some of the positive grids are lead coated titanium core grids having an expanded metal body portion. They have a thickness of less than 0.7 mm and are not a foil. Each of the titanium grids forms a plane having an imaginary line perpendicular thereto. In the "super-battery" there are preferably at least 19 positive grids per each 10 cm along the imaginary line. There are 144-240 grids (positive & negative) in a 275 mm long auto battery case.

The titanium grid core is a formed from a titanium alloy containing a platinum group metal in the amount of 0.001 to 0.9 of the group alloy. The term "platinum group metal" means platinum, palladium, osmium, rhodium, and ruthenium. Preferably the platinum group metal in the alloy is less than 0.9% selected from the group of palladium, ruthenium or palladium and ruthenium. Most preferably the metal is palladium in less than 0.25% of the alloy, for example 0.2%. Grades 7,11 of titanium alloy have 0.12-0.25% palladium, grades 16-18, 20 & 24 have 0.04-0.08% palladium ("lean palladium") and grades 13-15 & 26 & 27 contain 0.08-0.14% ruthenium. The alloy may also contain molybdenum 5-20% for corrosion protection. U.S. Patents relating to titanium alloys containing palladium and molybdenum include U.S. Pat. Nos. 6,334,913; 4,666,666 and 5,238,647. Titanium corrosion may be inhibited by surfactants, such as "tween" and other chemicals. The term titanium core includes grid cores of titanium alloy. "Hybrid" batteries are often called "asymmetric supercapacitors" or "hybrid battery/supercapacitors" or "ultra-battery".

The hybrid battery of the present invention, like a conventional lead-acid battery, is a multi-cell structure. Each cell comprises a set of vertical positive and negative flat plates formed of grids containing layers of electrochemically active pastes. Each of the grids has a lug which is electrically connected to other grids of the same polarity.

First Embodiment

This first embodiment is a long-life battery especially for stop-start cars. It uses relatively thicker negative and positive grids and thicker separators. The negative carbon based grids are each 2 mm thick. The positive grids use titanium cores of not flattened expanded metal 2 mm thick, copper and tin flash electroplated layers, and hot dip lead coatings of 200 microns (each side) and 0.2 mm over-paste (each side) for a total thickness of 2.8 mm. The separators are glass mats each 1 mm thick. The battery uses 60 grids and 30 separators for a total thickness of about 174 mm. This easily fits in a standard length 207 mm battery case (DIN 53621) and weighs less than a standard auto battery.

Second Embodiment

This second embodiment is a "super-battery" especially for electric cars (EV) and plug-in hybrid cars (PHEV). It uses thin grids and thin separators. The positive grids have a titanium core which is 0.35 mm thick of flattened expanded titanium alloy. A thin coating of lead of 75 microns (each side) is dip coated on electroplated flash coatings of copper and tin. The over-paste is 0.1 mm (each side), for a total thickness of about 0.71 mm.

The separators are 0.5 thick and the negative grids are 1 mm thick. The separators are plastic envelopes each 0.5 mm thick. The battery uses 180 grids and 90 separators for a total thickness of about 200 mm. This easily fits in a standard length 275 mm battery case (DIN 56311) and weighs less than a standard auto battery. It should provide 2.1 KW. A pack of 5 such batteries should provide 10.5 KW to drive a converted Prius 40 miles using only electric. The pack should cost less than $2000, which is ⅕ the cost of a Li-Ion battery pack of the same power, size and weight.

The "super-battery" especially for electric cars and hybrid cars has at least 144 grids in a case which is shorter than 200 mm. However it may have as many as 240 grids in a 275 mm long case.

A non-conductive separator and an acid electrolyte, based on sulfuric acid, is interposed between the positive and negative plates.

However, unlike conventional lead acid batteries:
1. the positive grids have an expanded metal core and the cores, for "super-batteries" batteries, are thin, less than 0.7 mm in thickness. Lead grids are usually 1.3 to 3.0 mm thick.
2. the positive grids are not of lead but are preferably coated with lead;

3. the positive grids are of a titanium alloy containing a platinum group metal, preferably with less than 0.9% palladium or ruthenium.
4. the negative grids are carbon assemblies with a metal core, a shield material sealing the core and an activated carbon and binder casing over the shield material.

What is claimed is:

1. A hybrid lead acid supercapacitor battery energy storage device comprising: a plurality of titanium core positive electrodes, a plurality of negative carbon electrode assemblies, a plurality of separators, a casing, and an acid electrolyte comprising an aqueous solution of sulfuric acid; wherein:
   (a) each of the titanium cores has an expanded metal body portion; (b) each of the titanium cores is a titanium alloy containing from 0.01 to 0.9% of a platinum group metal; (c) said titanium cores each having a hot dip coating selected from the groups of lead and lead alloy; (d) said each carbon electrode assembly comprises a negative current collector comprising a sheet of metal; (e) two sheets of electronically conductive corrosion resistive shield material sealing said sheet of metal between them; and (g) a sheet of activated carbon and a binder adhered to and in electrical contact with a surface of said shield material.

2. A hybrid lead acid supercapacitor battery energy storage device as in claim 1 wherein the titanium cores are of a titanium alloy containing 0.2% to 0.02% selected from the group of palladium, ruthenium and palladium combined with ruthenium.

3. A hybrid lead acid supercapacitor battery energy storage device as in claim 1, wherein the thickness of the titanium core, without a lead coating, is less than 0.4 mm and more than 0.2 mm.

4. A hybrid lead acid supercapacitor battery energy storage device of claim 1, wherein (d) the metal sheet is copper and said two sheets of electronically conductive shield material are sealed around the periphery of said sheet of copper, thereby encapsulating the sheet of copper.

5. A hybrid acid supercapacitor battery energy storage device of claim 1, wherein the at least one carbon electrode assembly comprises two electrodes of activated carbon and polytetrafluoroethylene, each electrode adhered to an opposing side of said shield material.

6. A hybrid lead acid supercapacitor battery energy storage device as in claim 1, wherein the shield material is graphite foil impregnated with paraffin drawn into the interior of the graphite foil.

7. A hybrid lead acid supercapacitor battery energy storage as in claim 1, wherein at least one carbon electrode assembly comprises carbon black.

8. A hybrid lead acid supercapacitor battery energy battery storage device as in claim 1; wherein the battery packs at least 144 grids in a distance shorter than 200 mm in length.

9. A hybrid lead acid supercapacitor battery energy storage device comprising: a plurality of titanium core positive electrodes, a plurality of negative carbon electrode assemblies, a plurality separators, a casing, and an acid electrolyte comprising an aqueous solution of sulfuric acid; wherein: (a) each of the titanium cores has an expanded metal body portion; (b) each of the titanium cores is a titanium alloy containing from 0.01 to 0.9% of a platinum group metal; (c) said titanium cores each having a lead coating which is a hot melt coating and not an electroplated coating; and wherein (d) said each carbon electrode assembly comprises a negative current collector comprising a sheet of metal; (e) two sheets of electronically conductive corrosion resistant shield material comprising graphite sealing said sheet of metal between them and having an outer surface; and (f) a sheet of activated carbon and a binder adhered to and in electrical contact with the outer surface of the shield material.

10. A hybrid lead acid supercapacitor battery energy storage device as in claim 9 wherein the two sheets of electronically conductive shield material comprise graphite.

11. A hybrid lead acid supercapacitor battery energy storage device as in claim 9 wherein the titanium cores are of a titanium alloy containing 0.2% to 0.02% selected from the group of palladium, ruthenium and palladium combined with ruthenium.

12. A hybrid lead acid supercapacitor battery energy storage device as in claim 9 wherein the thickness of the titanium core, without a lead coating, is less than 0.4 mm and more than 0.2 mm.

13. A hybrid lead acid supercapacitor battery energy storage device of claim 9, wherein in (d) the metal sheet is copper and said two sheets of electronically conductive shield material are sealed around the periphery of said sheet of copper, thereby encapsulating the sheet of copper.

14. A hybrid acid supercapacitor battery energy storage device of claim 9, wherein the at least one carbon electrode assembly comprises two electrodes of activated carbon and polytetrafluoroethylene, each electrode adhered to an opposing side of said shield material.

15. A hybrid lead acid supercapacitor battery energy storage device as in claim 9, wherein the shield material is graphite foil impregnated with paraffin drawn into the interior of the graphite foil.

16. A hybrid lead acid supercapacitor battery energy storage as in claim 9, wherein at least one carbon electrode assembly comprises carbon black.

\* \* \* \* \*